(12) United States Patent
Vollrath et al.

(10) Patent No.: US 6,551,067 B1
(45) Date of Patent: Apr. 22, 2003

(54) TWO-PIECE CONNECTING ROD FOR A RECIPROCATING COMPRESSOR AND METHOD FOR ASSEMBLING A TWO-PIECE CONNECTING ROD

(75) Inventors: Ingwald Vollrath, Joinvile SC (BR); Sérgio Luiz Maganhoto, Joinville SC (BR); Rivio Arturo Ramirez, Joinville SC (BR)

(73) Assignee: Empresa Brasileira de Compressores S.A. -Embraco, Joinville-SC (BR)

( * ) Notice: Subject to any disclaimer, the term of this patent is extended or adjusted under 35 U.S.C. 154(b) by 0 days.

(21) Appl. No.: 09/674,793
(22) PCT Filed: May 3, 1999
(86) PCT No.: PCT/BR99/00033
§ 371 (c)(1), (2), (4) Date: Jan. 2, 2001
(87) PCT Pub. No.: WO99/57437
PCT Pub. Date: Nov. 11, 1999

(30) Foreign Application Priority Data

May 4, 1998 (BR) .............................................. 9802053

(51) Int. Cl.$^7$ ................................................ F04B 00/00
(52) U.S. Cl. .......................................... 417/53; 92/128
(58) Field of Search ...................... 417/53, 571; 92/187, 92/157, 128; 74/579 E; 419/28

(56) References Cited

U.S. PATENT DOCUMENTS

| | | | | |
|---|---|---|---|---|
| 4,469,473 A | * | 9/1984 | Brown ........................ 417/571 |
| 4,930,405 A | * | 6/1990 | Lillie ........................... 92/128 |
| 5,247,873 A | * | 9/1993 | Owens et al. .................. 92/157 |
| 5,524,507 A | * | 6/1996 | Olmr et al. ................ 74/579 E |
| 5,613,182 A | * | 3/1997 | Lynn ............................. 419/28 |
| 5,671,655 A | * | 9/1997 | Vollrath ....................... 92/128 |
| 5,737,976 A | * | 4/1998 | Haman ..................... 74/579 E |
| 6,178,873 B1 | * | 1/2001 | Pierobon ..................... 92/187 |

\* cited by examiner

Primary Examiner—Teresa Walberg
Assistant Examiner—Leonid Fastovsky
(74) Attorney, Agent, or Firm—Darby & Darby

(57) ABSTRACT

A two-piece connecting rod for a reciprocating compressor and method for assembling a two-piece connecting rod, said connecting rod comprising an engaging portion (21), which is provided in one of the parts defined by a first connecting rod portion (10), to be mounted to the eccentric (6) of a crankshaft (4) of the compressor, and by a second connecting rod portion (20), to be articulated to a piston (8) reciprocating inside a cylinder (7), which is closed by a cylinder head (9); and a guide portion (11) provided in the other of said parts, to be slidingly coupled with the engaging portion (21); and a fixation means, applied to the coupling region between the engaging portion (21) and the guide portion (11), with the first connecting rod portion (10) being mounted to the eccentric (6) and with the second connecting rod portion (20) being mounted to the piston (8) lodged in the cylinder (7), in order to lock said portions against relative displacements in a position which results in a predetermined axial distance between the top face of the piston, in the upper dead point condition, and the inner face of the cylinder head (9) of the cylinder (7) of the compressor which is being mounted.

11 Claims, 3 Drawing Sheets

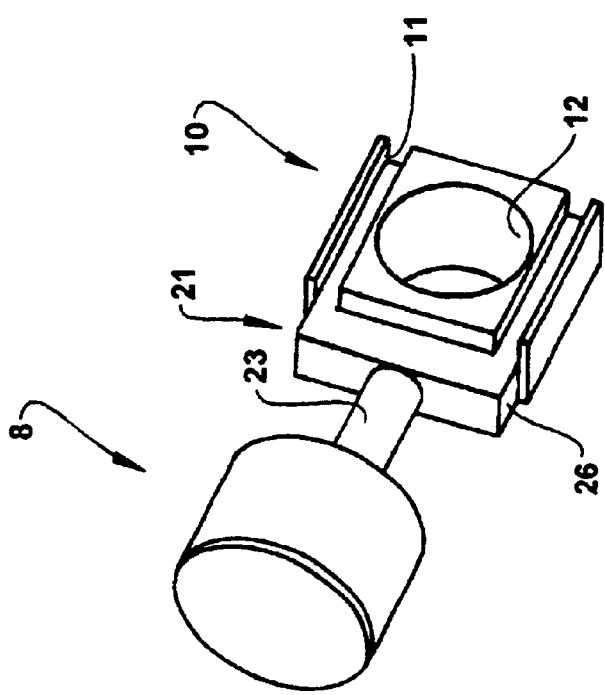
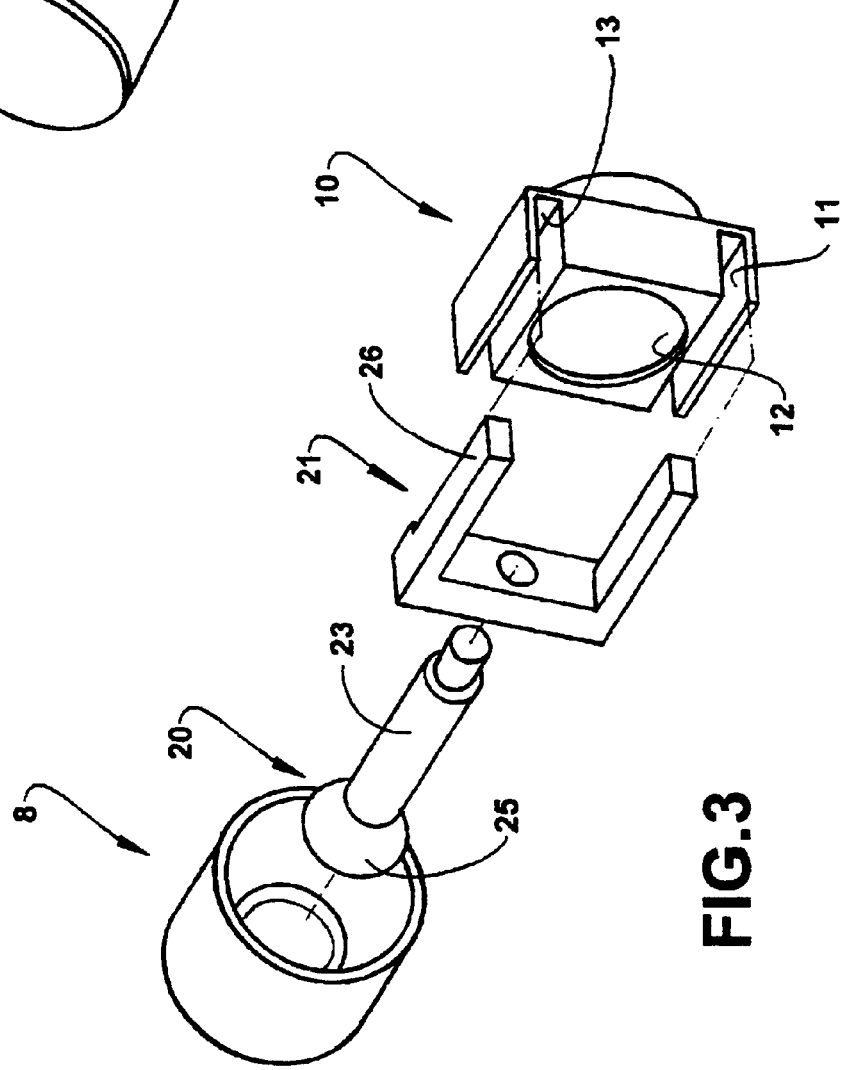

TWO-PIECE CONNECTING ROD FOR A RECIPROCATING COMPRESSOR AND METHOD FOR ASSEMBLING A TWO-PIECE CONNECTING ROD

FIELD OF THE INVENTION

The present invention refers to a two-piece connecting rod and to a method for assembling a two-piece connecting rod in a reciprocating hermetic compressor of the type used in small refrigerating machines, such as refrigerators, freezers, drinking fountains, etc.

BACKGROUND OF THE INVENTION

The reciprocating compressors used in refrigerating systems have a connecting rod, which is mounted, at one side, to an eccentric of a crankshaft supported on a cylinder block and, at the other side, to a piston reciprocating inside a cylinder, with a stroke orthogonal in relation to the eccentric axis, between a lower dead point condition and an upper dead point condition, which are respectively defined by a maximum and by a minimum linear spacing between the piston top and a valve plate, which is mounted to a cylinder end and which defines an inner face of a cylinder head assembly defining suction and discharge chambers of the compressor.

In these constructions, in the upper dead point condition, the piston should have a certain spacing from an inner face of the valve plate of the cylinder head, defining, in this region, a certain minimum dead volume, which is previously determined in order to avoid, during normal operation of the compressor, the occurrence of impacts of the piston against the cylinder head.

In order to avoid the performance of the compressor to be impaired, the dead volume produced in the region adjacent to the cylinder head should have a minimum value, which also avoids loss of compressor yield.

As a function of the reduced size of the components and of the exiguous space for mounting the piston-connecting rod-eccentric pin assembly, different constructive alternatives for the connecting rod have arisen, aiming at facilitating to mount this assembly to the compressor, among which the ones using a two-piece connecting rod, due to the facility to mount the latter to the eccentric and piston parts.

In the known constructions of a two-piece connecting rod, the mutual fitting between the connecting rod portions, each to be mounted to a respective part defined by the eccentric or the piston, is achieved so that the connecting rod presents, with the fixation of said connecting rod portions, its designed length, which is previously established as a function of a nominal design distance between the eccentric axis and a plane coinciding with the outer face of the cylinder top, in the upper dead point condition.

As a function of this previous length determination and of the dimensional variations existing in the compressor components and which may modify the relative position between the eccentric and piston parts, the assembly of the connecting rod to said parts usually determines a different length from that optimum desired length.

In order to facilitate the determination of the dead volume between the top of the piston head and a plane containing the inner face of the cylinder head, in the constructions in which the valve plate is affixed to the cylinder after mounting the piston thereto, the connecting rod is dimensioned so that the top of the piston head be substantially coplanar to the plane containing the cylinder top, in the upper dead point condition. The determination of the desired dead volume is obtained by combining gaskets of distinct thicknesses provided between the cylinder top and the valve plate.

For the constructions in which the assembly of the piston to the cylinder occurs after attaching the valve plate to the cylinder, the dimensioning of the dead volume depends upon the dimensional characteristics of the parts involved in the assembly (piston, connecting rod, cylinder, etc.), the control of said dead volume being a function of the perfect dimensioning of said parts.

The high precision required for the components involved in mounting the piston to the eccentric leads to high costs for obtaining these components. Moreover, the known solutions for a two-piece connecting rod have many components and are difficult to assemble.

DISCLOSURE OF THE INVENTION

Thus, it is the object of the present invention to provide a two-piece connecting rod and a method for assembling a two-piece connecting rod which permits the piston/connecting rod/eccentric assembly to be easily and quickly mounted, without requiring high dimensional precision for each of the involved parts, but which permits the dead volume in the cylinder to be controlled more precisely, independently of the type of the construction and of the method for mounting said assembly.

This object of the invention is achieved by a two-piece connecting rod for a reciprocating compressor, comprising a first connecting rod portion to be mounted to the eccentric of a crankshaft of the compressor and a second connecting rod portion to be articulated to a piston reciprocating inside a cylinder with an end closed by a cylinder head, said connecting rod comprising: an engaging portion, provided in one of the parts defined by the first and the second connecting rod portions; a guide portion, provided in the other of said parts, for coupling with the engaging portion, said coupling allowing the mutual relative displacement between said parts towards the axis of the connecting rod; and a fixation means, applied to the coupling region between the engaging portion and the guide portion, the first connecting rod portion being mounted to the eccentric and the second connecting rod portion being mounted to the piston lodged in the cylinder, in order to lock said portions against relative displacements in a position which results in a predetermined axial distance between the top face of the piston, in the upper dead point condition, and the inner face of the cylinder head of the cylinder.

This connecting rod is obtained by a method including the steps of:

a—mounting the first connecting rod portion to the eccentric of the crankshaft;

b—coupling, with a certain degree of mutual mechanical interference, the engaging portion with the guide portion;

c—sliding, axially towards the axis of the connecting rod, the engaging portion in relation to the guide portion, until the top face of the piston mounted inside the cylinder remains, in the upper dead point condition of the eccentric, at a predetermined axial distance from the inner face of the cylinder head of the cylinder;

d—retaining said parts defined by the engaging portion and guide portion to each other, against involuntary relative axial displacements, by means of said mutual mechanical interference; and e—mutually affixing the parts defined by the engaging portion and guide portion through a fixation means applied to the mutual coupling region between said connecting rod portions.

BRIEF DESCRIPTION OF THE DRAWINGS

The invention will be described below, with reference to the attached drawings, in which:

FIGS. 3 and 3a illustrate, schematically and in a perspective view, as in FIGS. 2 and 2a, another embodiment of the two-piece connecting rod of the present invention.

BEST MODE OF CARRYING OUT THE INVENTION

The present invention will be described in relation to a two-piece connecting rod of the type which operates in a reciprocating hermetic compressor used in refrigerating systems.

Figure 1:
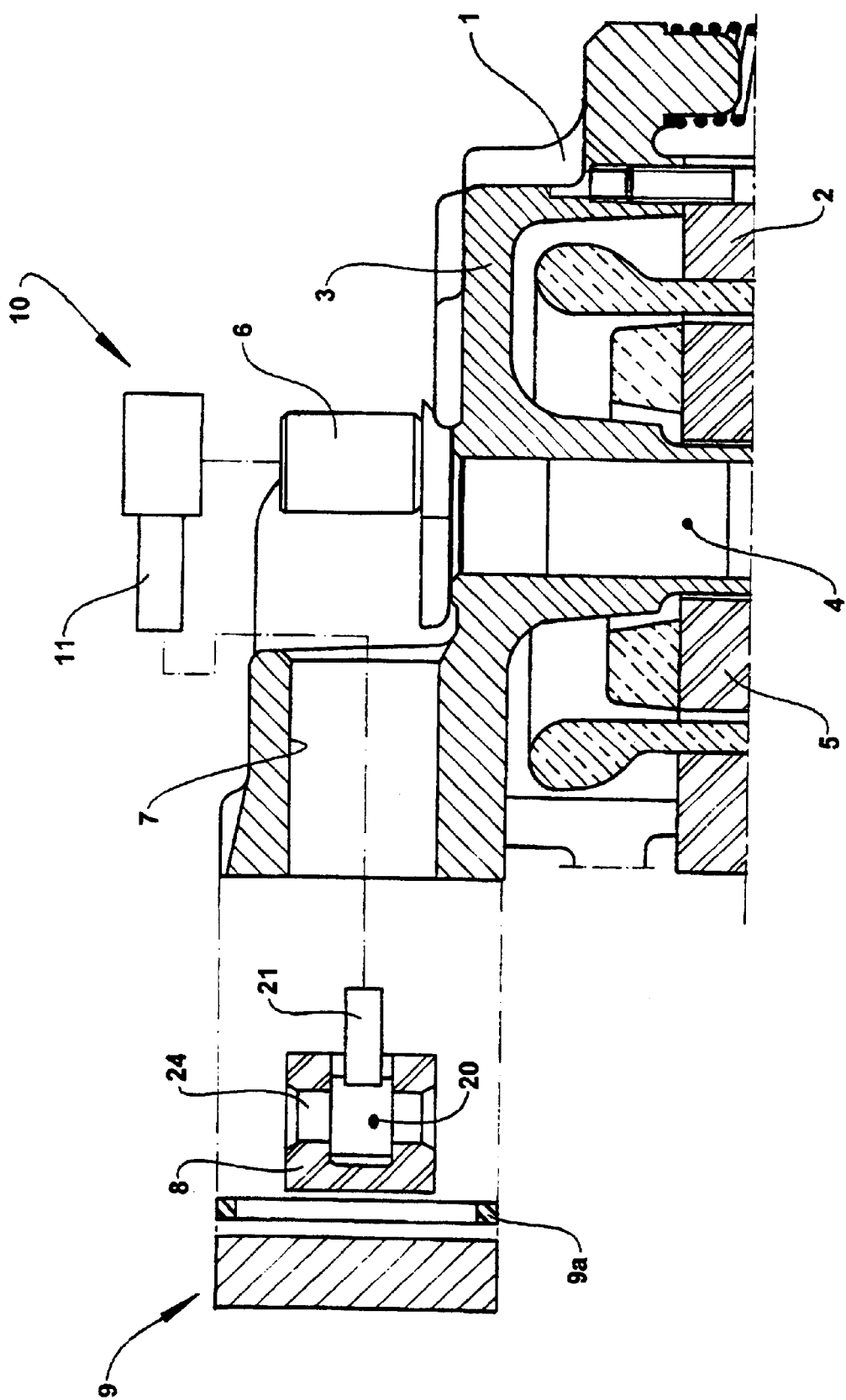
FIG. 1 illustrates, schematically and in a longitudinal sectional view, part of the internal region of a reciprocating compressor, where is mounted a piston-connecting rod-eccentric assembly of said compressor, said components being mounted to each other and in which the connecting rod is constructed according to an embodiment of the present invention.

According to FIG. 1, inside a hermetic shell of a reciprocating compressor is mounted a motor-compressor unit, comprising a block 1, in which is mounted the stator 2 of the electric motor and provided a bearing 3, for supporting a crankshaft 4 which carries, at the lower portion thereof, a rotor 5 of the motor and which has, at its upper portion, an eccentric 6.

Block 1 further lodges a cylinder 7, in whose inside reciprocates a piston 8, travelling orthogonally to the axis of the eccentric 6, between a lower dead point condition and an upper dead point condition, which are respectively defined by a maximum and by a minimum linear spacing between the top of piston 8 and an inner face of a cylinder head 9, including a valve plate and mounted to an end portion of the cylinder, opposite to that for mounting the piston 8, usually by means of at least one gasket 9a.

The connection between piston 8 and crankshaft 4 is obtained by a two-piece connecting rod, having a first connecting rod portion 10, mounted to the eccentric 6, and a second connecting rod portion 20, articulated to the piston 8, said parts defined by the first and second connecting rod portions 10, 20 being attached to each other by applying, in the coupling region of said parts, a fixation means, such as glue, weld, etc., when said parts are engaged to each other in a determined position, which is previoustly obtained as described ahead.

According to the present invention, the two-piece connecting rod have an engaging portion 11 provided in one of said parts defined by the first and second connecting rod portions 10, 20, and a guide portion 21 provided in the other of said parts, to be coupled with the engaging portion 11, with the first connecting rod portion 10 being mounted to the eccentric 6.

For obtaining the two-piece connecting rod of the present invention, the mounting of the parts defined by the first and second connecting rod portions 10, 20 to each other occurs by mutually relative sliding the engaging portion 11 and the guide portion 21, until reaching a position defining a predetermined minimum axial distance between the top face of the piston 8 and an inner face of the cylinder head of the cylinder 7, when they are at a maximum relative approximation during the displacement of the piston 8, i.e., when piston 8 is in the upper dead point condition.

According to the illustrations, the first connecting rod portion 10 includes a first eye 12 to be mounted to the eccentric 6.

Figure 2:
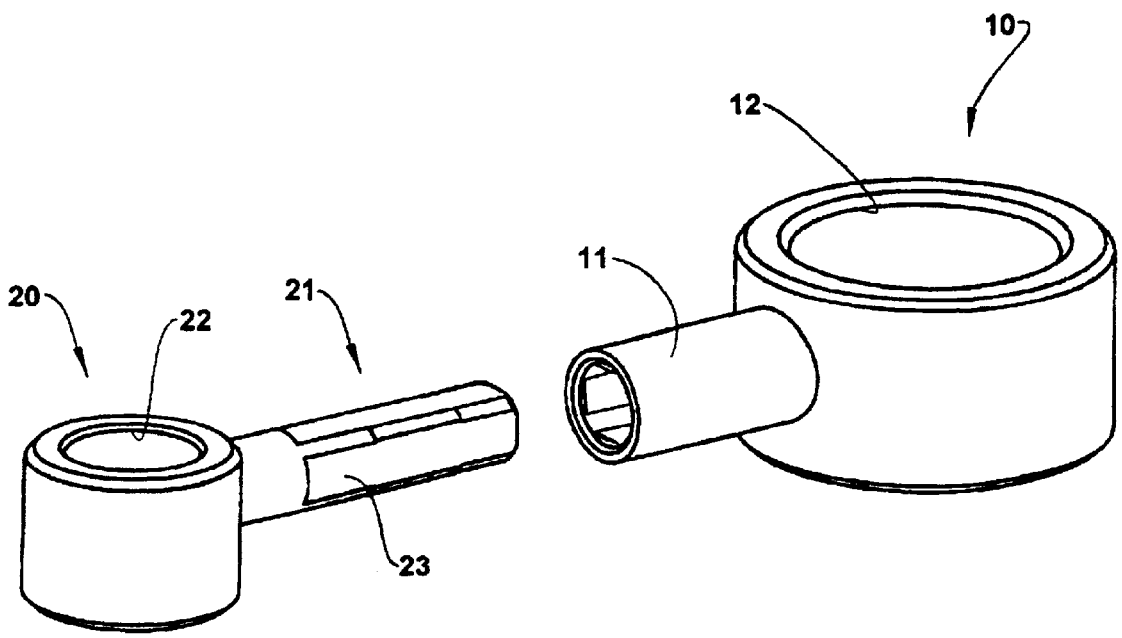
FIGS. 2 and 2a illustrate, schematically and in an enlarged perspective view, the two-piece connecting rod illustrated in FIG. 1, respectively in the condition in which the connecting rod portions are separated from each other and in the condition in which they are coupled to each other.
Figure 2A:
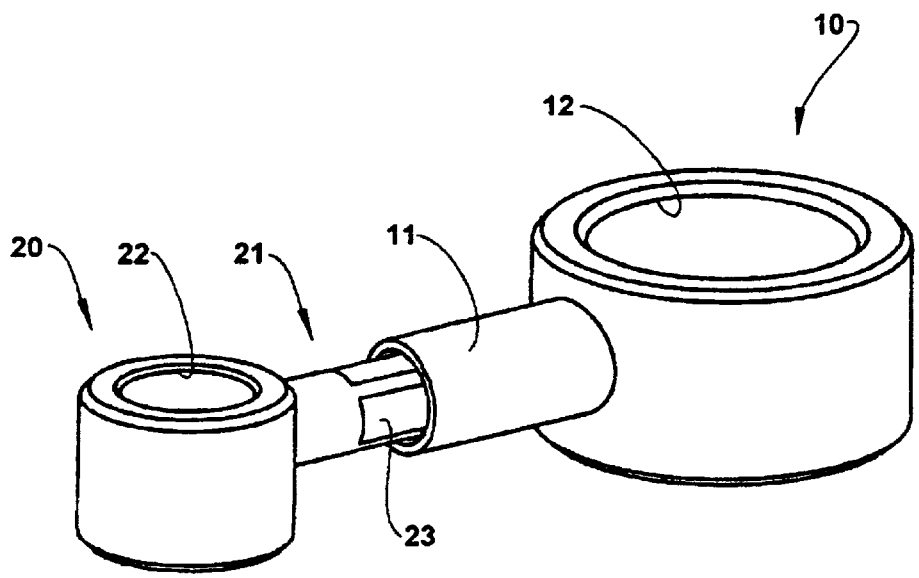

In a construction for the two-piece connecting rod of the present invention, as illustrated in FIGS. 2 and 2a, the second connecting rod portion 20 includes a second eye 22 and at least part of a rod 23 of the connecting rod in the form of an elongated radial projection, which is incorporated, by one end, to said second eye 22, said second eye 22 being articulated inside the piston 8, through an articulating pin 24.

In this construction, the first eye 12 is provided with a tubular radial projection defining the guide portion 11, which is dimensioned to lodge, by telescopic fitting, the engaging end portion 21, upon assembly of the two-piece connecting rod, with the first connecting rod portion 10 being already mounted to the eccentric 6.

According to this construction, before mounting the cylinder head 9 to the cylinder 7, the second connecting rod portion 20 already mounted to the piston 8 is conducted, by an adequate equipment, through the end of the cylinder 7 whereto the cylinder head 9 is mounted, until its engaging end portion 21 is coupled to the guide portion 11 of the first connecting rod portion 10, which is already with its first eye 12 mounted around the eccentric 6, the latter being in an upper dead point position and having the guide portion 11 aligned with the axis of the cylinder 7. The engaging portion 21 is then conducted to slide through the inside of the guide portion 11 until the top of the piston 8 reaches a predetermined position in relation to the cylinder head mounting end of the cylinder 7.

The coupling obtained in this position is maintained, for instance, by mutual mechanical interference between the involved parts, such as by engaging means provided in said parts, attrition, etc., until the actuation, in this coupling region, of a fixation means to guarantee the maintenance of the relative positioning between the first and the second connecting rod portions 10, 20 against involuntary axial displacements in relation to each other.

In a constructive alternative, the mechanical interference is obtained by engaging projections provided in one of the parts defined by the engaging portion 21 and guide portion 11 and actuating against stops provided in the other of said parts.

In another construction for a two-piece connecting rod obtained according to the present invention (FIGS. 3 and 3a), the second connecting rod portion 20 defines the whole rod of the connecting rod and carries, at one end, a spherical articulation 25 to be mounted to piston 8 and, at an opposite end, at least one sliding arm 26 of the engaging portion 21 to be received and slidingly lodged in a respective sliding channel 13 of the first connecting rod portion 10.

In the illustrated embodiment, the engaging portion 21 is in the form of a fork, having a pair of sliding arms 26, each being fittable into a respective sliding channel 13 laterally provided in relation to the first eye 12 of the first connecting rod portion 10. In a constructive alternative of the present invention, the engaging portion 21 is coupled to a free end of the rod 23 of the connecting rod.

For this construction of a two-piece connecting rod, the assembly of the connecting rod is achieved by introducing the second connecting rod portion 20, already mounted to the piston 8, into the inside of the cylinder 7, through the end thereof facing the eccentric 6, with the first connecting rod portion 10 being or not being already mounted to said eccentric 6.

In the solutions in which the assembly of the connecting rod to the parts defined by the piston 8 and eccentric 6 occurs with the cylinder 7 being already closed by the cylinder head 9, the introduction of the second connecting rod portion 20, incorporating or already carrying the respective engaging portion 21, into the inside of cylinder 7, occurs by conducting the first connecting rod portion 10 to a lower dead point position, in order to allow the second connecting rod portion 20 and piston 8 be mounted to the cylinder 7. After this positioning, the eccentric 6 is taken to the upper dead point position, in order to allow the engaging portion 21 to be slidingly coupled with the guide portion 11.

After the sliding fitting of the engaging portion 21 into the guide portion 11, a certain extension of the rod 23 of the connecting rod is submitted to heat during a certain time and to a determined temperature, which are pre-established and result in a determined axial thermal dilatation of the second connecting rod portion 20 superior to that maximum dilatation to which the connecting rod is submitted during the compressor operation, the eccentric then being conducted to the upper dead point condition, upon the top of piston 8 seating onto the inner face of the cylinder head 9.

This position is maintained, by mechanical interference between the first and the second connecting rod portions, until the determined extension of the connecting rod has cooled (naturally or forcedly) when, for instance, the fixation means is applied to retain said portions against relative axial displacements during the compressor operation.

The cooling of the coupling region leads to a linear retraction of the rod of the connecting rod, which results in a determined distance, between the top of the piston and the plane of the inner face of the cylinder head 9 of the cylinder, calculated to correspond to a desired determined dead volume inside the cylinder.

In any of the possible constructions for the two-piece connecting rod, the fixation means may be applied to at least one of the parts defined by the engaging portion 21 and guide portion 11, before the mutual coupling thereof, allowing the relative sliding therebetween for achieving the desired positioning between the piston 8 and the inner face of the cylinder head 9, which positioning is determined as a function of a certain dead volume which has been pre-established as optimum to each compressor which is being mounted.

What is claimed is:

1. A two-piece connecting rod for a reciprocating compressor, comprising:
    a first connecting rod portion to be mounted to the eccentric of a crankshaft of the compressor;
    a second connecting rod portion to be articulated to a piston reciprocating inside a cylinder with an end closed by a cylinder head;
    an engaging portion, provided on one of the parts defined by the first and the second connecting rod portions;
    a guide portion, provided on the other of said parts, for coupling with the engaging portion, said coupling allowing the mutual relative displacement between said parts towards the axis of the connecting rod; and
    a fixation means, applied to the coupling region between the engaging portion and the guide portion, with the first connecting rod portion being mounted to the eccentric and with the second connecting rod portion being mounted to the piston lodged in the cylinder, in order to lock said portions against relative displacements in a position which results in a predetermined axial distance between the top face of the piston, in the upper dead point condition, and the inner face of the cylinder head of the cylinder, said parts defined by the guide portion and the engaging portion being coupled with a degree of mutual mechanical interference, sufficient to maintain said relative axial positioning between said portions independently of the actuation of the fixation means.

2. A two-piece connecting rod, as in claim 1, wherein the first connecting rod portion incorporates a first eye provided with a radial tubular projection defining the guide portion and which lodges the engaging portion by telescopic fitting with said second connecting rod portion incorporating a second eye from which projects part of the rod of the connecting rod the second connecting rod portion incorporates a second eye from which projects part of the rod of the connecting rod.

3. A two-piece connecting rod, as in claim 2, wherein the second connecting rod portion incorporates a second eye from which projects part of the rod of the connecting rod and the first connecting rod portion incorporates a first eye provided with at least one sliding channel to lodge a respective sliding arm of the engaging portion.

4. A two-piece connecting rod, as in claim 3, wherein the engaging portion is in the form of a fork, having a pair of sliding arms, each being fittable into a respective sliding channel laterally provided in relation to the first eye of the first connecting rod portion.

5. A two-piece connecting rod, as in claim 4, wherein the engaging portion is coupled to a free end of the rod of the connecting rod.

6. A two-piece connecting rod, as in claim 1, wherein the fixation means maintains said relative positioning by means of one of an adhesive or welding.

7. Method for assembling a two-piece connecting rod in a reciprocating compressor, said connecting rod comprising a first connecting rod portion to be mounted to the eccentric of a crankshaft of the compressor, and a second connecting rod portion to be articulated to a piston reciprocating inside a cylinder with an end closed by a cylinder head, one of said connecting rod parts carrying an engaging portion and the other of said parts carrying a guide portion comprising the steps of:
    a—mounting the first connecting rod portion to the eccentric of the crankshaft;
    b—coupling by mutual mechanical interference, the engaging portion with the guide portion in a predetermined axial distance between the top face of the piston, in the upper dead point condition, and the inner face of the cylinder head of the cylinder;
    c—sliding, axially towards the axis of the connecting rod, the engaging portion in relation to the guide portion, until the top face of the piston mounted inside the cylinder remains, in the upper dead point condition of the eccentric, at a predetermined axial distance from the inner face of the cylinder head of the cylinder;
    d—retaining said parts defined by the engaging portion and guide portion to each other, against involuntary relative axial displacements, by means of said mutual mechanical interference; and
    e—mutually affixing the parts defined by the engaging portion and guide portion through a fixation means applied in the mutual coupling region between said connecting rod portions.

8. Method, as in claim 7, further comprising the steps of:

positioning the guide portion aligned to the axis of the cylinder and in the upper dead point condition of the eccentric of the crankshaft;

mounting the second connecting rod portion to the piston;

introducing into the cylinder, through its end whereto is mounted the cylinder head, the second connection rod portion mounted to the piston; and displacing, axially, the piston second connection rod portion assembly towards the first connecting rod portion, until the top face of the piston reaches said predetermined axial distance from the inner face of the cylinder head of the cylinder.

9. Method, as in claim 7, further comprising the steps of:

mounting the second connecting rod portion to the piston;

introducing the piston and the second connecting rod portion into the inside of the cylinder, through the end thereof which is facing the eccentric; and after the step of slidingly coupling the engaging portion and the guide portion to each other, the steps of:

heating an extension of the rod of the connecting rod, to obtain an axial thermal dilatation of the second connecting rod portion greater than the maximum dilatation to which the connecting rod is submitted during the compressor operation, and conducting the eccentric to the upper dead point condition, upon the top of piston seating onto the inner face of the cylinder head;

cooling the extension of the rod of the connecting rod and providing the fixation between the engaging portion and guide portion.

10. Method, as in claim 7, further comprising the step of:

providing at least one of the parts defined by the engaging portion and guide portion with the fixation means before the mutual coupling of said portions.

11. Method, as in claim 7, wherein the fixation between the engaging portion and the guide portion is obtained by one of adhesively affixing and welding techniques.

* * * * *